(12) United States Patent
Lu

(10) Patent No.: US 8,977,725 B2
(45) Date of Patent: Mar. 10, 2015

(54) METHOD AND APPARATUS FOR A UNIFIED VIRTUAL NETWORK INTERFACE

(75) Inventor: Yunsong Lu, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 212 days.

(21) Appl. No.: 13/462,656

(22) Filed: May 2, 2012

(65) Prior Publication Data

US 2013/0297753 A1      Nov. 7, 2013

(51) Int. Cl.
*G06F 15/177* (2006.01)
(52) U.S. Cl.
USPC ................................. 709/220; 709/223; 718/1
(58) Field of Classification Search
USPC ....................... 709/220, 223; 718/1
See application file for complete search history.

(56) References Cited

U.S. PATENT DOCUMENTS

| 2004/0085997 A1* | 5/2004 | Mancour ....................... 370/466 |
| 2008/0240142 A1 | 10/2008 | Belgaied et al. |
| 2011/0216775 A1 | 9/2011 | Gargett |
| 2012/0054740 A1* | 3/2012 | Chakraborty et al. ............ 718/1 |
| 2013/0159428 A1* | 6/2013 | Soundararajan et al. ..... 709/206 |

\* cited by examiner

*Primary Examiner* — Yves Dalencourt

(57) ABSTRACT

An apparatus for sharing network capabilities of a host system by one or more virtual machines. A unified virtual network interface instance is included within an operating system of a virtual machine operating within a virtual environment. The interface instance provides device specific network capability for the virtual machine. A host system supports the virtual machine and includes a network capability provider instance that interfaces with the unified virtual network interface to provide the device specific network capability for the virtual machine. A network capability provider enforces sharing of host-wide network capability as implemented through the one or more unified virtual network interfaces supported by the host system.

15 Claims, 5 Drawing Sheets

METHOD AND APPARATUS FOR A UNIFIED VIRTUAL NETWORK INTERFACE

BACKGROUND

In a virtualization environment, network resources managed by a host operating system are virtualized and shared with one or more virtual machines. For instance, in a host system there may be a physical network resource, such as a network interface, that provides communication between the virtual machines and external communication networks. The sharing of the network resource is critical to the performance, security, and efficiency of the virtual network supported by the host system.

Each of the virtual machines includes a virtualized network interface that gives the operating system of the virtual machine access to the physical network interface of the host system. There are different technologies for virtualizing the network interface in a traditional system. One example includes a hardware emulation of a network interface card (NIC) at the operating system of the virtual machine. This includes emulation of an existing physical NIC at the virtual machine to handle network packets received from and delivered to the virtual machine. In another example, a para-virtualization driver includes a front-end/back-end model that combined provide the functionality of a virtual NIC to the virtual machine. In each of the traditional mechanisms for interfacing, the virtualized network interface communicates with a back-end implementation, such as a software bridge or network address translator, of the host system that facilitates sharing of the physical network interface.

The traditional mechanism for providing virtualized network interfacing for sharing a network resource of a host system are strictly device-oriented. That is, the existing virtualized network interfacing techniques provide for the emulation and implementation of the virtual NICs in order to provide virtual links between the virtual devices and the physical network resource.

However, while these traditional networking solutions provide for the sharing of the physical network resource, they do not address the issue of on-demand service requirements. In particular, each of the traditional network interfacing solutions is unaware of the underlying physical network resource, and as such, are unable to meet and provide quality of service (QoS) requirements for the virtual machines. As an example, a host system may include a network resource providing 1 Gigabyte/per second (Gbps) of bandwidth capability. In addition, the host system may support a number of virtual machines, each of which requires a certain bandwidth capability. As a drawback, the traditional networking solutions are unable to provide by themselves any distribution of bandwidth between the three virtual machines to meet individual and/or collective QoS requirements. As such, a single virtual machine may lock up the entire bandwidth for its own use without any consideration of the bandwidth requirements of the other remaining virtual machines.

This problem is further highlighted when migrating a virtual machine from one host system to a destination host system. In particular, the virtual machine is associated with a predefined QoS requirement, such as a predefined bandwidth capability. This QoS requirement for the virtual machine is required on whichever host system the virtual machine resides. However, when the virtual machine is migrated to the destination host system, because the traditional networking solutions for providing virtualized network interfacing is device oriented, the QoS for the migrated virtual machine is not implemented within the destination host system. This occurs even though the QoS policy may also be migrated along with the associated virtual machine. That is, the newly migrated virtual machine is unable to have its bandwidth capability metrics met, especially if the bandwidth capability for the host system has already been allocated.

SUMMARY

An apparatus for sharing network capabilities of a host system by one or more virtual machines (VMs). The system includes a host system that supports a VM operating within a virtual environment. The host system includes a network capability provided by a hardware-based network resource that is sharable between one or more VMs supported by the host system. An operating system of a VM includes a unified virtual network interface (UVNI) instance that provides device specific network capability for that VM. The host system includes a network capability provider instance that interfaces with the UVNI instance to provide the device specific network capability for the VM. In addition, the system includes a network capability provider that enforces sharing of host-wide network capability as implemented through the one or more unified virtual network interfaces supported by the host system.

In some embodiments, an apparatus includes a tangible, non-transitory computer-readable storage medium having stored thereon, computer-executable instructions that, when executed causes the computer system to perform a method for providing service oriented network interfacing. The method includes providing a host system that supports one or more VMs operating within one or more virtual environments. The host system includes a network capability provided by a hardware-based network resource that is sharable between one or more VMs supported by the host system. The method further includes providing a unified virtual network interface instance within an operating system of a VM that provides device specific network capability for the VM. The method also includes providing a network capability provider instance within an operating system of the host system. The UVNI provider instance is configured to interface with the unified virtual network interface in order to provide the device specific network capability for the VM through the host system. The method further includes providing a network capability provider comprising one or more provider instances associated with one or more VMs. The network capability provider enforces the sharing of the host-wide network capability as implemented through one or more unified virtual network interfaces of one or more VMs.

In one embodiment, a computer system comprises a processor coupled to memory having stored therein instructions that, if executed by the computer system, cause the computer to execute a method for configuring network interfacing. The method includes providing a host system that supports one or more VMs operating within one or more virtual environments. The host system includes a network capability provided by a hardware-based network resource that is sharable between one or more VMs supported by the host system. The method also includes receiving at the host system a unified virtual network interface instance included within an operating system of a VM operating within a virtual environment, such as, when the VM is migrated to the host system. The network interface instance provides device specific network capability for the VM. The method also includes creating a network capability provider instance operating within an operating system of the host system. The provider instance is configured to interface with the unified virtual network interface in order to provide the device specific network capability for the VM through the host system. The method further includes configuring a network capability provider to include the network capability provider instance, wherein the network capability provider comprises one or more provider instances associated with one or more VMs. The network capability provider is configured for enforcing sharing of host-wide network capability as implemented through one or more unified virtual network interfaces.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure illustrate the implementation of a design of a unified virtual network interface (UVNI) network, which defines a UVNI virtual device and service/capability based provider model providing network interfacing to VMs. UVNI instances are presented to guest operating systems of VMs by the hypervisor or host operating system. The service/capability based provider is included in the hypervisor and/or host operating system. Embodiments of the present disclosure provide for simplified manageability of one or more virtual network interfaces. The UVNI virtual device and service/capability based provider model enforces predictable quality of service (QoS) when sharing a network resource among one or more virtual network interface users. In addition, the UVNI virtual device and service/capability based provider model is implementable across virtualization environments of varying formats as the network capability provider model abstracts network capability across different media or physical hardware network resource implementations.

Figure 1:
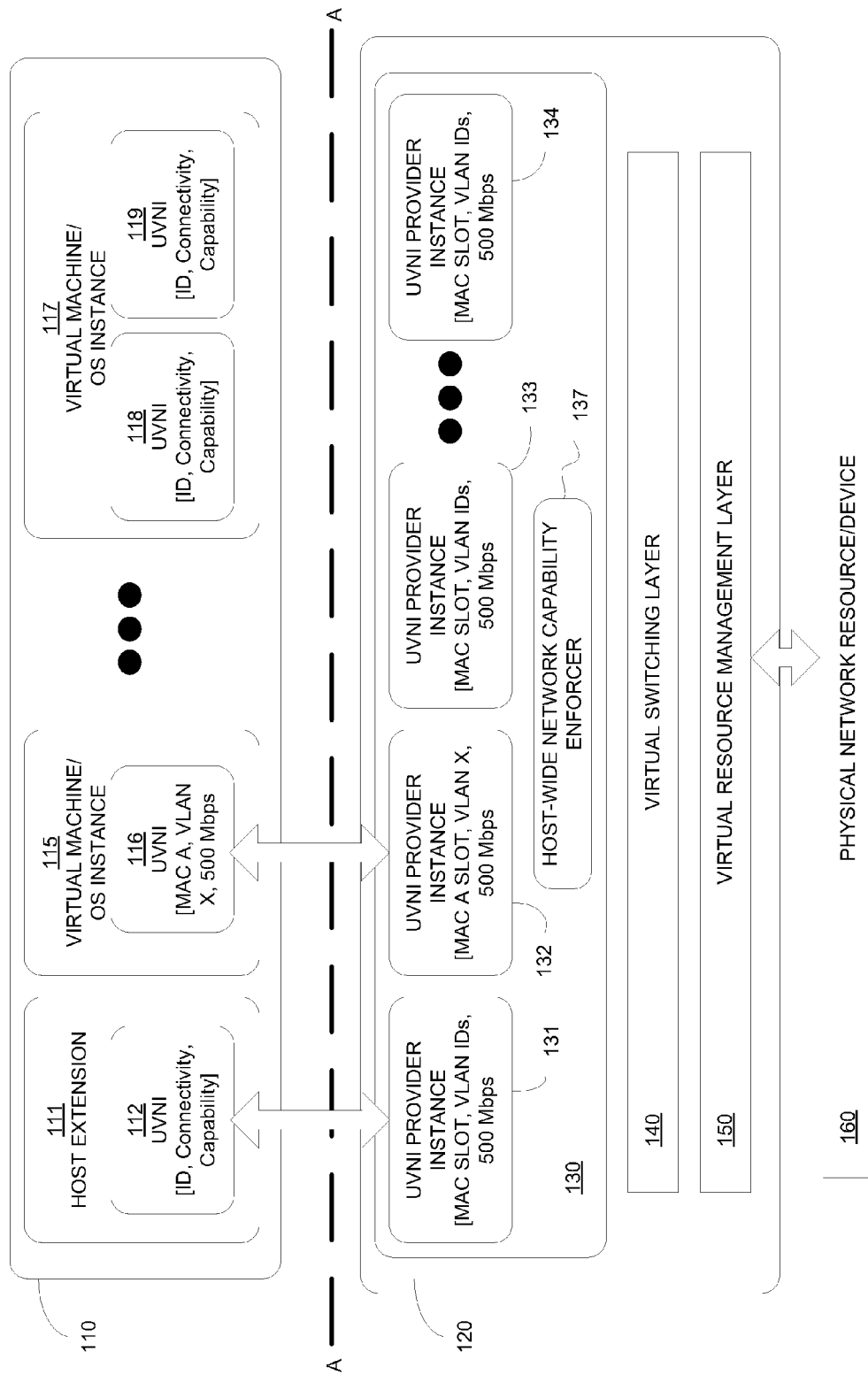
FIG. 1 is a block diagram of an apparatus capable of providing service oriented network interfacing through a unified virtual network interface instance and provider combination, in accordance with one embodiment of the present disclosure.

FIG. 1 is a block diagram of a host system 100 capable of providing service oriented network interfacing through a combination of UVNI device/UVNI provider instances, in accordance with one embodiment of the present disclosure. Host system 100 is implementable within system 510 of FIG. 5 in one embodiment, and is configured to support one or more VMs with service oriented network interfacing to a communication network.

As shown in FIG. 1, host system 100 includes one or more VMs, each of which are operating within its own virtual environment. One or more virtual machines, each with a corresponding operating system instance, are shown operating above line A-A in a guest operating system/VM layer 110. For instance, VM 115 including its corresponding operating instance is supported by host system 100. Other VMs are supported by host system 100, such as VM 117 and its corresponding operating instance.

As shown, each of the VMs includes a unified virtual network interface (UVNI) instance operating and defined within an operating system of the corresponding VM. For instance, VM 115 includes UVNI instance 116. Also, a VM may have more than one network interface instances providing access to one or more communication networks. As an example, VM 117 includes UVNI instance 118 and UVNI instance 119. Further, each UVNI instance defines a virtualized network device providing specific network capability for a corresponding virtual machine. The UVNI device instance may be implemented as a pluggable interface implemented in a guest driver for handling abstracted hardware offloading features. In particular, a UVNI device instance defines a UVNI virtual device, which is presented to a corresponding guest operating system of a VM by the host system 100. In that manner, the communication with the VM over a communication network is implemented through the corresponding UVNI virtual device.

In one embodiment, the UVNI device instance defines the configuration settings for a network interface allowing its VM to communicate over a communication network using a specific data link standard, such as, Ethernet, Wi-Fi, Layer 2 virtual local area network (VLAN), etc. For instance, a UVNI device instance is configured to characterize the device specific network capability of a VM for universal implementation within any UVNI capable host. In one embodiment, a fully abstracted UVNI defines a 3-tuple data structure comprising a unique identifier, network connection information, and service capability information. As shown in FIG. 1, each UVNI device instance defines a 3-tuple data structure including a unique identifier (ID), connectivity information, and capability information. For instance, UVNI device instance 112 is associated with host device 100, UVNI device instance 116 is associated with VM 115, UVNI device instance is associated with VM 117, and UVNI device instance is also associated with VM 117. Each of the UVNI device instances define a corresponding 3-tuple data structure used for implementing a service/capability based network interface model for its corresponding VM.

In particular, the 3-tuple data structure includes the unique identifier which uniquely identifies the UVNI so that other network interfaces over a communication network are able to locate and communicate with the corresponding network interface of the VM. In one implementation, the unique identifier is an Ethernet media access control (MAC) address (48 bit identifier) associated with the VM. Other methods for providing a unique identifier are contemplated and supported by the UVNI device implementation. For example, unique identifiers having more than 48 bits or less than 48 bits are contemplated for uniquely identifying the specific UVNI device instance.

Also, the 3-tuple data structure includes network connection information which defines the network configuration associated with the VM and the UVNI network interface. The connection information provides information about how to connect the UVNI network interface to the communication network. That is, the connection information indicates which communication standard is implemented and which network the UVNI network interface is connected to for purposes of communication. For instance, the connection information may define a particular VLAN network through a VLAN designator, or Ethernet network, etc.

In addition, the 3-tuple data structure includes service capability information that is predefined and associated with the corresponding VM. Service capability information includes any quality of service (QoS) metric that defines the resource reservation requirements guaranteeing/requiring a certain level of performance to data flow for the corresponding VM. For instance, the service capability information may include guaranteed/required bandwidth or throughput provided to the corresponding VM over a communication network. Other service capability requirements are contemplated and supported by the UVNI device implementation, such as, but not limited to bandwidth, priority, security, etc.

As an example of an UVNI device instance, VM 115 includes UVNI device instance 116, which defines a 3-tuple data structure including a unique identifier, connectivity, and capability information. In particular, UVNI device instance 116 defines a unique identifier as a "MAC A" string, or the MAC address ("MAC A") assigned to the VM 115. In addition, connection information as defined by the UVNI instance 116 indicates that the UVNI device instance should be connected to VLAN X so that VM 115 is able to communicate with other devices also connected to VLAN X. In addition, UVNI device instance 116 defines a capability requirement of 500 Mbps, such that VM 115 is guaranteed a bandwidth of 500 Mbps through host system 100 and over the VLAN X communication network.

In one embodiment, this 3-tuple data structure as defined by a corresponding UVNI device instance is portable, such that a UVNI device instance may be installed or implemented within any host system capable of supporting UVNI. More particularly, the capability requirements as specified and defined by the UVNI device instance is portable, such no matter which host system is supporting the VM and its UVNI device instance, the VM is assured that its capability requirements are met or at least considered by that host system.

As shown in FIG. 1, a network capability provider 130 provides sharable network capability for one or more UVNI provider instances. That is, the network capability provider 130 comprises a network capability enforcer 137 for enforcing sharing of a host-wide network capability (e.g., bandwidth, throughput, etc.) as implemented through one or more UVNI supported by the host system 100. For example, network capability provider 130 includes one or more UVNI provider instances 131, 132, 133, and 134. Each UVNI device instance in a corresponding VM works in combination with a corresponding UVNI provider instance to implement a network interface for the corresponding VM. In particular, as shown in FIG. 1, UVNI provider instances are included within a host operating system/hypervisor (or virtual machine manager) layer 120 of the host system 100. As such, each network capability provider instance operates within the operating system or virtual machine manager of the host system.

More particularly, each network capability provider instance interfaces with a corresponding UVNI device instance to provide the device specific network capability for a corresponding VM as defined by the corresponding UVNI device instance through the host system 100. For example, UVNI provider instance 132 interfaces with UVNI device instance 116 to provide network connectivity to VM 115. That is, UVNI provider instance 132 is configured to connect VM 115 to VLAN X and to provide a capability or service of 500 Mbps. Also, each of the UVNI device instances is implemented in combination with a corresponding UVNI provider instance, though not all associations are shown in FIG. 1.

Further, each UVNI provider instance defines the configuration settings for a network interface allowing the corresponding VM to communicate over a communication network. In particular, a UVNI provider instance defines a 3-tuple data structure comprising an identifier holder, connection information, and capability information. Because each UVNI provider instance is associated with and interfaces with a corresponding UVNI device instance of a corresponding VM, the configuration settings for both the UVNI provider instance and the UVNI device instance match where necessary.

In particular, the 3-tuple data structure of the UVNI provider instance includes an identifier holder (e.g., UVNI_ID_HOLDER), which includes the unique identifier of the corresponding UVNI device instance. For instance, the identifier holder for UVNI provider instance 132 includes the unique identifier included within the UVNI device instance 116, or "MAC A." Also, the 3-tuple data structure of the UVNI provider instance includes connection information. The connection information is associated with the corresponding VM device. For instance, network connection information defines the network configuration associated with the corresponding VM and its UVNI network interface to provide information about how to connect the UVNI device instance, as implemented through the corresponding UVNI provider instance, to the communication network. For instance, the connection information may define a particular VLAN network as implemented through a VLAN designator, or Ethernet network, etc. In addition, the 3-tuple data structure for the UVNI provider instance includes capability information which defines the service requirements associated with the corresponding VM and its UVNI network interface, as implemented through the corresponding UVNI provider instance, to the communication network.

As an example, UVNI provider instance 132 is associated with VM 115 and UVNI device instance 116. UVNI provider instance 132 defines a 3-tuple data structure that is matched to the information provided in the 3-tuple data structure of the UVNI device instance 116 previously introduced. Specifically, the 3-tuple data structure of the UVNI provider instance 132 defines an identifier holder as "MAC A," which matches the identifier provided by the UVNI device instance 116. Also, the UVNI provider instance defines the connection information as VLAN X so that the VM 115 is able to communicate with other devices over communication network VLAN X, as implemented through the UVNI provider instance 132. This matches with the connection information provided in the UVNI device instance 116. Further, the 3-tuple data structure of the UVNI provider instance 132 includes a capability requirement of 500 Mbps, such that VM 115 is guaranteed a bandwidth of 500 Mbps through host system 100 as implemented through UVNI provider instance 132. This also matches the capability information provided in the UVNI device instance 116.

Additional information may be included within the UVNI provider instance 132. For instance, property information may be further defined by the UVNI provider instance 132. This information defines one or more properties that are changeable or volatile for the underlying hardware network resource 160.

In another embodiment, a UVNI provider instance is implemented to provide and/or reserve capability services to the host system 100. In particular, as shown in FIG. 1, UVNI provider instance 131 is associated with and interfaces with a host-based UVNI device instance 112. The host-based UVNI is included within the operating system of the host system and comprises host specific network capability, as defined in a 3-tuple data structure. UVNI provider instance 131, operating within the operating system of the host system 100, in combination with the UVNI device instance 112 include matched information, such as, unique identifier, connection information, and capability information. More specifically, the UVNI provider instance is configured to provide the host-specific network capability for the host system 100. That is, the UVNI provider instance includes capability information to ensure that performance characteristics for the host system 100 are guaranteed, reserved, or at least considered. For instance, as shown in FIG. 1, UVNI provider instance 131 reserves 500 Mbps of bandwidth or throughput for the host system as implemented through an underlying hardware-based network resource 160.

As shown in FIG. 1, network capability provider 130 includes an enforcer 137 that is configured to enforce the sharing of the host-wide network capability as provided by the hardware based network resource 160. That is, provider 130 enforces the sharing of the network interfacing of the one or more VMs supported by the host system 100 through any technique for implementing and enforcing QoS. For example, the VMs in virtual machine layer 110 share the capabilities (e.g., bandwidth, throughput, etc.) provided by the underlying hardware based network resource 160. As such, network capability enforcer 137 as implemented in combination with each of the UVNI device instances/UVNI provider instances is configured to enforce the sharing of the capabilities provided by the underlying hardware-based network resource 160. In that manner, the network capability enforcer 137 is able to consider each of the VMs capability requirements and implement a QoS protocol for sharing the capabilities of the underlying network resource 160 based on capability requirements for each of the VMs. As such, a single VM is unable to take up the majority of the network capability without any consideration of the capability/service requirements of the other VMs.

The virtual resource management layer 150 is configured to abstract network capabilities from different media or physical hardware, each of which operate under different formats. As such, each of the UVNI provider instances is able provide abstracted network capabilities to the UVNI device instance of the corresponding VM through the use of the virtual resource management layer 150.

In addition, virtual switching layer 140 ensures the sharing of network resource 160 between the plurality of VMs supported by host system 100. More specifically, switching layer 140 routes packets incoming from the external communication network or from internal VMs to the targeted VM.

Figure 2:
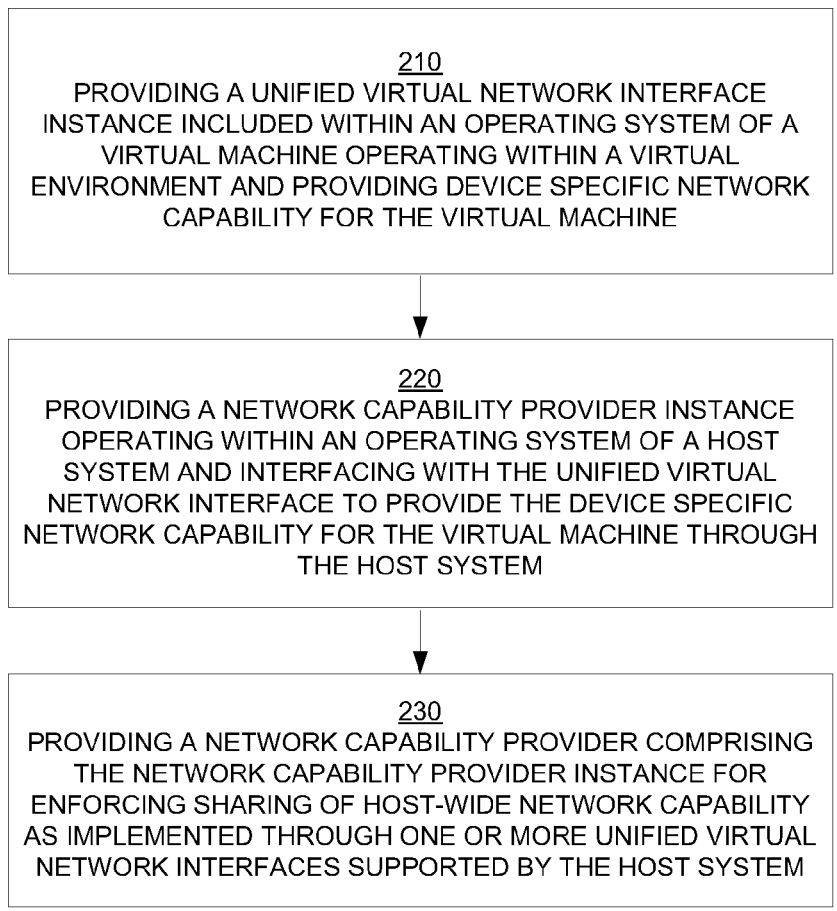
FIG. 2 is a flow diagram illustrating a method of providing service oriented network interfacing through a unified virtual network interface instance and provider combination, in accordance with one embodiment of the present disclosure.

FIG. 2 is a flow diagram 200 illustrating a method of providing service/capability oriented network interfacing to VMs through a UVNI device instance and UVNI provider instance, in accordance with one embodiment of the present disclosure. In one embodiment, flow diagram 200 illustrates a computer implemented method of providing service/capability oriented network interfacing to VMs through a UVNI device instance and UVNI provider instance, in accordance with one embodiment of the present disclosure. In another embodiment, flow diagram 200 is implemented within a computer system including a processor and memory coupled to the processor and having stored therein instructions that, if executed by the computer system causes the system to execute a method for providing service/capability oriented network interfacing to VMs through a UVNI device instance and UVNI provider instance. In still another embodiment, instructions for performing the method are stored on a non-transitory computer-readable storage medium having computer-executable instructions for causing a computer system to perform a method for providing service/capability oriented network interfacing to VMs through a UVNI device instance and UVNI provider instance as outlined by flow diagram 200.

Figure 5:
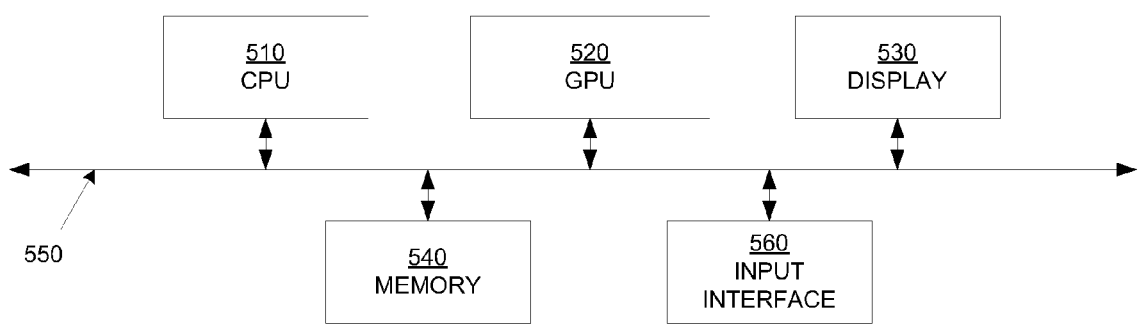
FIG. 5 depicts a block diagram of an exemplary computer system suitable for implementing the present methods in accordance with one embodiment of the present disclosure.

The operations of flow diagram 200 are implemented within the system 510 of FIG. 5 and/or host system 100 of FIG. 1, in embodiments of the present invention. For instance, flow diagram 200 is implemented within a host system that is configured to support one or more VMs, each of which are associated with an operating system operating within its own virtual environment, with service oriented network interfacing to one or more communication networks.

At 210, a unified virtual network interface instance is provided within an operating system of a corresponding VM supported by a host system. The UVNI device instance provides specific network capability for the VM when accessing a communication network. In particular, the UVNI device instance defines a virtual device that is presented to a corresponding guest operating system of a VM by the host system to provide communication to and from the VM over a communication network.

As previously described, the UVNI device instance defines the configuration settings for a network interface allowing the VM to communicate over a communication network. The UVNI device instance defines a 3-tuple data structure comprising a unique identifier, network connection information, and service capability information. As such, the 3-tuple data structure as defined within the UVNI device instance is configured to characterize the device specific network capabilities of the VM for universal implementation within any UVNI capable host system.

In one implementation, the 3-tuple data structure includes a unique identifier, such as an Ethernet MAC address, or any suitable identifier. In addition, the 3-tuple data structure includes network connection information which defines the network configuration associated with the VM and the UVNI network interface. This connection information defines which communication standard and which network the UVNI network interface uses for purposes of communication to and from the VM. Also, the 3-tuple data structure includes service capability information that is associated with the corresponding VM. This capability information includes QoS metrics (e.g., bandwidth, throughput, priority, security, etc.) that defines the resource reservation requirements to guarantee or at least consider a certain level of performance in terms of data flow and performance for the corresponding VM. In other embodiments, the data structure may include more than or less than 3 pieces of information.

As previously described, the 3-tuple data structure as defined by a corresponding UVNI device instance is portable throughout a communication network. As such, a UVNI device instance is implementable within any host system capable of supporting a unified virtual network interface as implemented by embodiments of the present disclosure. In that manner, a UVNI device instance migrated to a destination host system will have its capability requirements satisfied, or at least considered within the capability environment of the destination host system.

At 220, a network capability provider instance is created or provided within the operating system of the host system. Each UVNI provider instance in combination with a corresponding UVNI device instance is configured to provide the device specific network capability for a corresponding VM through the host system. In particular, the UVNI provider instance defines the configuration settings for the network interface allowing the corresponding VM to communicate over a communication network through the UVNI device instance and UVNI provider instance combination. In one embodiment, the UVNI provider instance defines a 3-tuple data structure that matches, where necessary, the data structure defined in the UVNI device instance of the VM. For instance, the 3-tuple data structure in the UVNI provider instance defines an identifier holder, connection information, and capability information. The identifier holder matches the unique identifier as provided by the corresponding UVNI device instance. The connection information defines the network configuration associated with the corresponding VM and its UVNI network interface indicating how to connect the VM, through the UVNI device instance and UVNI provider instance, to a communication network. The capability information defines the service capability required or negotiated for the VM, and matches the capability information provided in the corresponding UVNI device of the VM. The UVNI provider instance may also include additional property information related to volatile characteristics of the underlying hardware-based network resource.

At 230, a network capability provider is provided, and includes one or more UVNI provider instances, each of which interfaces with a corresponding UVNI device instance to implement a network interface for a corresponding VM. In addition, the network capability provider enforces the sharing of a host-wide network capability (e.g., bandwidth, throughput, etc.), as provided by an underlying hardware-based network resource, and as implemented through the combination of one or more UVNI device instances and UVNI provider instances. Specifically, the network capability provider is implemented in combination with each of the UVNI device/UVNI provider instances to enforce the sharing of host-wide network capabilities provided by the underlying hardware-based network resource. As such, a single VM is unable to dominate the capabilities provides by the network resource, and all VMs supported by a host system will have their capability/service requirements considered through the implementation of the network capability provider.

In one embodiment, a host-based UVNI device instance is provided within the operating system of the host system. The UVNI device instance defines host specific network capability, and is configured to reserve network capability for the host system. In addition, a network capability provider or UVNI provider instance is provided for operation within the operating system of the host system. The UVNI provider instance is configured to provide the host specific network capability for the host system as implemented through the combination of the UVNI device instance and UVNI provider instance.

Figure 3:
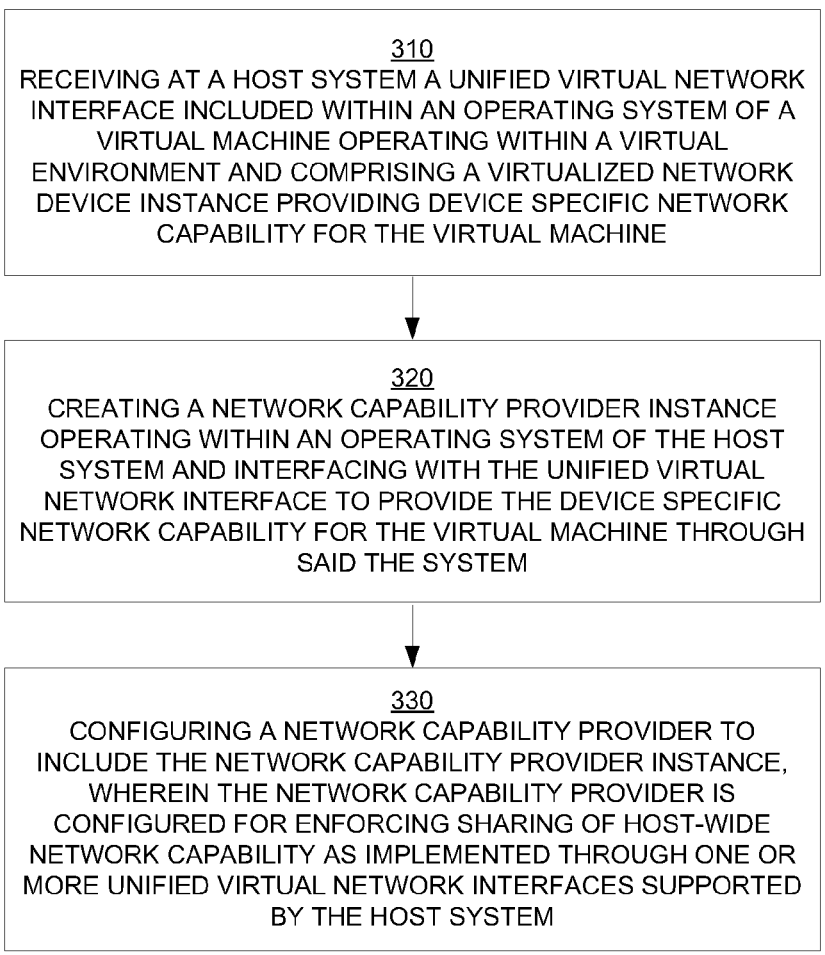
FIG. 3 is a flow diagram illustrating a method of providing service oriented network interfacing through a unified virtual network interface instance and provider combination during migration of a VM to a destination host system, in accordance with one embodiment of the present disclosure.

FIG. 3 is a flow diagram 300 illustrating a method for implementing a service/capability based network interface model for a VM. In one embodiment, flow diagram illustrates a computer implemented method of providing service/capability oriented network interfacing to a VM which is migrated to a destination host system, through a UVNI device instance and UVNI provider instance, in accordance with one embodiment of the present disclosure. In another embodiment, flow diagram 300 is implemented within a computer system including a processor and memory coupled to the processor and having stored therein instructions that, if executed by the computer system causes the system to execute a method for providing service/capability oriented network interfacing to a VM which is migrated to a destination host system. In still another embodiment, instructions for performing the method are stored on a non-transitory computer-readable storage medium having computer-executable instructions for causing a computer system to perform a method for providing service/capability oriented network interfacing to a VM which is migrated to a destination host system as outlined by flow diagram 200.

The operations of flow diagram 300 are implemented within the system 510 of FIG. 5 and/or host system 100 of FIG. 1, in embodiments of the present invention. For instance, flow diagram 300 is implemented within a host system that is configured to support one or more VMs, each of which are associated with an operating system operating within its own virtual environment, with service oriented network interfacing to one or more communication networks.

The operations of flow diagram 300 are described within the context of migrating a VM to a destination host system for illustration purposes only. That is, though described within the context of migration, the operations of flow diagram 300 is implementable within a host system that is configured to receive a newly introduced VM (e.g., through definition, migration, etc.) and incorporate capability requirements associated with that newly introduced VM in light of the other capability requirements of other VMs supported by the host system.

At 310, a host system is receiving a UVNI device instance included within an operating system of a VM. For instance, the VM is being migrated into the receiving host system, in one embodiment. The migrated VM is operating within an virtual environment supported by the host system. In addition, the migrated UVNI device instance defines a virtualized network interface providing device specific network capability for the VM.

As previously described, the UVNI device instance defines the configuration settings for the network interface allowing the VM to communicate over a communication network. For instance, the UVNI device instance defines a 3-tuple data structure comprising a unique identifier, network connection information, and service capability information. The 3-tuple data structure is configured for universal implementation within any UVNI capable host system, and is configured to define the device specific network capabilities of the VM.

At 320, at the host system a network capability provider instance, or UVNI provider instance, is created. The UVNI provider instance operates within an operating system of the host system, and is configured to interface with the UVNI device instance of the migrated VM. The UVNI provider instance in combination with the UVNI device instance are configured to provide the device specific network capability for the VM through the host system.

At the host system, at 330 the network capability provider is configured to include the newly created UVNI provider instance. As previously described, the network capability provider includes one or more UVNI provider instances, each of which interfaces with a corresponding UVNI device instance to implement a network interface for a corresponding VM. In addition, the network capability provider enforces the sharing of a host-wide network capability (e.g., bandwidth, throughput, etc.), as provided by an underlying hardware-based network resource, and as implemented through the combination of one or more UVNI device instances and UVNI provider instances. As such, the capability/service requirements of the newly migrated VM will be enforced and/or at least considered by the network capability provider when the host-wide network capability of the underlying network resource (e.g., network interface) is distributed.

Figure 4:
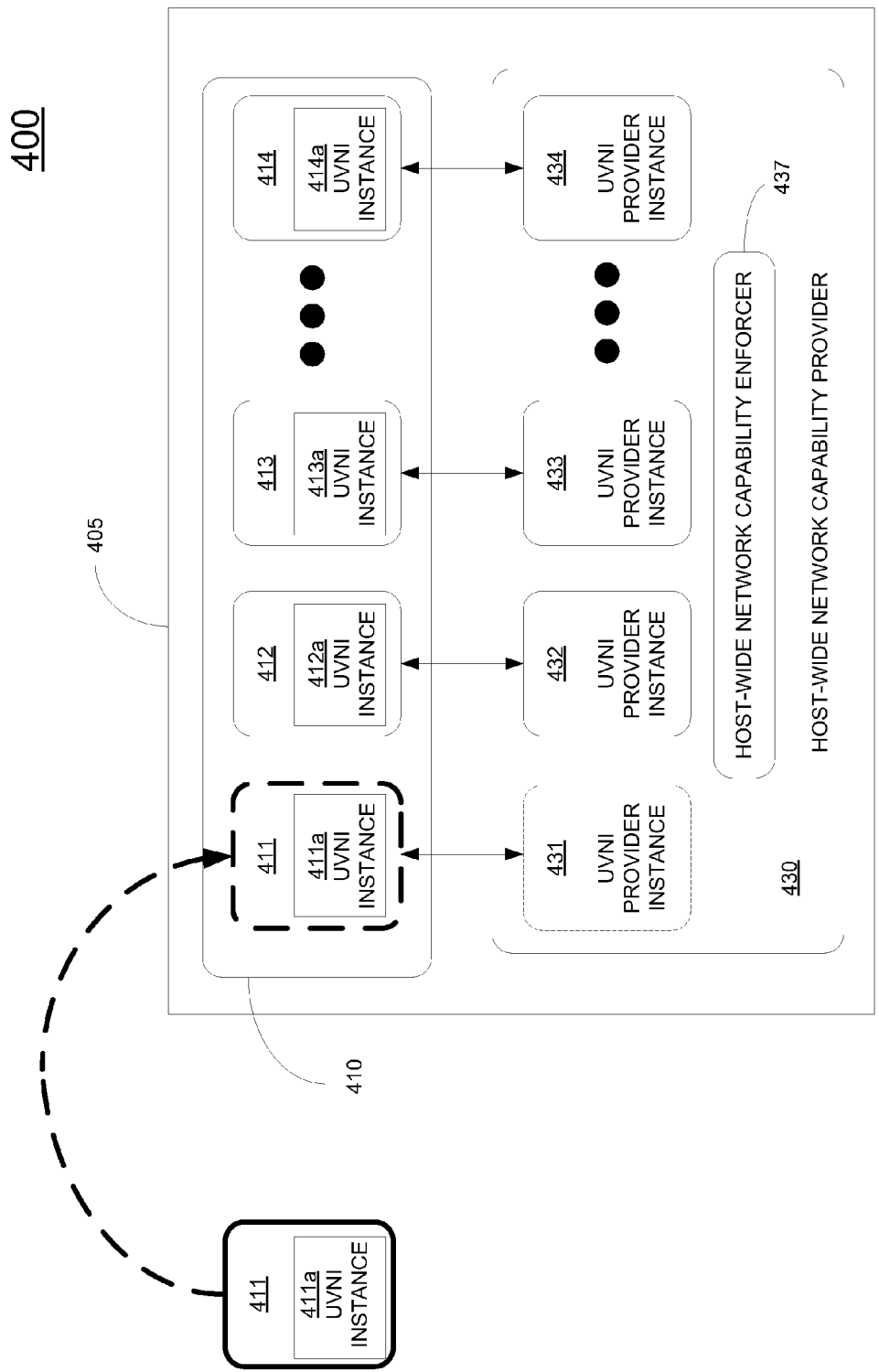
FIG. 4 is a data flow diagram illustrating a method of providing service oriented network interfacing through a unified virtual network interface instance and provider combination during migration of a VM to a destination host system, in accordance with one embodiment of the present disclosure.

FIG. 4 is a data flow diagram 400 illustrating the implementation of a service/capability based network interface model for one or more VMs within a host system 405. As shown in FIG. 4, a host system incorporates a newly migrated VM through the creation and/or implementation of a combination of UVNI device/UVNI provider instances to ensure that the service/capability requirements for the migrated VM are enforced, or at least considered in light of the other capability requirements of other VMs supported by the host system 405.

As shown in FIG. 4, a host system 405 includes one or more VMs, each of which operate within its own virtual environment. Host system 405 is implemented within system 510 of FIG. 5, or host system 100 of FIG. 1, in embodiments. One or more VMs are shown operating within a guest operating system/virtual machine layer 410. For instance, layer 410 includes one or more VMs 412, 413, and 414. In addition, each VM includes a UVNI device instance operating and defined within an operating system of the corresponding VM. For instance VM 412 includes an UVNI device instance 412a, VM 413 includes an UVNI device instance 413a, and VM 414 includes an UVNI device instance 414a. As previously described, each UVNI device instance defines the configuration settings for a network interface allowing its corresponding VM to communicate over a communication network using a specific data link standard. For instance, the UVNI device instance defines a 3-tuple data structure including a unique identifier (ID), connectivity information, and capability information.

In addition, VM 411 is being migrated into the guest operating system/hypervisor layer 410, as shown in FIG. 4. As such, corresponding UVNI device instance 411a is also being migrated to layer 410.

Also, host system 405 includes a network capability provider 430 that provides sharable network capability for one or more VMs. In particular, the network capability provider 430 comprises one or more UVNI provider instances 431, 432, 433, and 434. Each UVNI device instance works in combination with a corresponding UVNI provider instance to implement a network interface for the corresponding VM. As previously described, each UVNI provider instance defines the configuration settings for a network interface allowing the corresponding VM to communicate over a communication network, as implemented through the combination of UVNI device/UVNI provider instances. In particular, as shown in FIG. 4 UVNI provider instances are included within a host operating system/hypervisor layer of the host system 405, and are configured to provide device specific network capability for a corresponding VM as defined by the corresponding UVNI device instance through host system 405. For example, UVNI provider instance 432 interfaces with UVNI device instance 412a to provide network connectivity to VM 412. Also, UVNI provider instance 433 interfaces with UVNI device instance 413a to provide network connectivity to VM 413. Further, UVNI provider instance 434 interfaces with UVNI device instance 414a to provide network connectivity to VM 414.

In particular, network capability provider 430 also includes UVNI provider instance 431 which interface with the UVNI device instance 411a to provide network connectivity to the newly migrated VM 411. In that manner, the network capability enforcer 437 is able to enforce sharing of a host-wide network capability (e.g., bandwidth, throughput, etc.) with the newly migrated VM, as implemented through one or more combinations of UVNI device/UVNI provider instances supported by the host system 200. In that manner, the capability requirements of the newly migrated VM, as defined by the UVNI device and UVNI provider instances will be enforced, implemented, and or considered within the context of capability requirements of all VMs supported by the host system that are requesting the underlying hardware-based network resource (e.g., network interface).

FIG. 5 is a block diagram of an example of a computing system 500 capable of implementing embodiments of the present disclosure. Computing system 500 broadly represents any single or multi-processor computing device or system capable of executing computer-readable instructions. Examples of computing system 500 include, without limitation, workstations, laptops, client-side terminals, servers, distributed computing systems, handheld devices, or any other computing system or device. In its most basic configuration, computing system 500 may include at least one processor 510 and a system memory 540.

Both the central processing unit (CPU) 510 and the graphics processing unit (GPU) 520 are coupled to memory 540. System memory 540 generally represents any type or form of volatile or non-volatile storage device or medium capable of storing data and/or other computer-readable instructions. Examples of system memory 540 include, without limitation, RAM, ROM, flash memory, or any other suitable memory device. In the example of FIG. 5, memory 540 is a shared memory, whereby the memory stores instructions and data for both the CPU 510 and the GPU 520. Alternatively, there may be separate memories dedicated to the CPU 510 and the GPU 520, respectively. The memory can include a frame buffer for storing pixel data drives a display screen 530.

The system 500 includes a user interface 560 that, in one implementation, includes an on-screen cursor control device. The user interface may include a keyboard, a mouse, and/or a touch screen device (a touchpad).

CPU 510 and/or GPU 520 generally represent any type or form of processing unit capable of processing data or interpreting and executing instructions. In certain embodiments, processors 510 and/or 520 may receive instructions from a software application or hardware module. These instructions may cause processors 510 and/or 520 to perform the functions of one or more of the example embodiments described and/or illustrated herein. For example, processors 510 and/or 520 may perform and/or be a means for performing, either alone or in combination with other elements, one or more of the monitoring, determining, gating, and detecting, or the like described herein. Processors 510 and/or 520 may also perform and/or be a means for performing any other steps, methods, or processes described and/or illustrated herein.

In some embodiments, the computer-readable medium containing a computer program may be loaded into computing system 500. All or a portion of the computer program stored on the computer-readable medium may then be stored in system memory 540 and/or various portions of storage devices. When executed by processors 510 and/or 520, a computer program loaded into computing system 500 may cause processor 510 and/or 520 to perform and/or be a means for performing the functions of the example embodiments described and/or illustrated herein. Additionally or alternatively, the example embodiments described and/or illustrated herein may be implemented in firmware and/or hardware.

Embodiments of the present disclosure may be implemented by using hardware only or by using software and a necessary universal hardware platform. Based on such understandings, the technical solution of the present invention may be embodied in the form of a software product. The software product includes a number of instructions that enable a computer device (personal computer, server, or network device) to execute the method provided in the embodiments of the present disclosure.

Embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), USB flash disk, digital versatile disks (DVDs) or other optical storage, magnetic cassettes, magnetic tape, removable hard disk, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Thus, according to embodiments of the present disclosure, systems and methods are described which illustrate the implementation of a unified virtual network interface (UVNI) network, which defines a UVNI virtual device and service/capability based provider model providing network interfacing to VMs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. An apparatus, comprising:
a plurality of virtual machines operating within a virtual environment;
a plurality of unified virtual network interface instances included within a plurality of operating systems of said plurality of virtual machines and providing a plurality of device specific network capabilities comprising network connectivity and quality of service requirements including network bandwidth allocation requirements for said plurality of virtual machines;
a plurality of network capability provider instances operating within an operating system of a host system and interfacing with said plurality of unified virtual network interface instances in paired relationships to provide said plurality of device specific network capabilities for said plurality of virtual machines through said host system; and
a network capability provider comprising said plurality of network capability provider instances for enforcing sharing of host-wide network bandwidth based on said quality of service requirements of said plurality of unified virtual network interface instances as implemented through said plurality of unified virtual network interfaces supported by said host system;
wherein a network capability provider instance comprises a 4-tuple data structure comprising an identifier holder for holding a unique identifier of a corresponding unified virtual network interface instance; a configurable network connectivity provided for a corresponding virtual machine by said host system; a services capability provided for said virtual machine; and properties of an underlying hardware resource provided said host-wide network capability.

2. The apparatus of claim 1, wherein a unified virtual network interface instance is configured to characterize corresponding device specific network capability for universal implementation within any network capability provider configured on any host system.

3. The apparatus of claim 1, wherein said unique identifier comprises a MAC address.

4. The apparatus of claim 1, wherein said network connectivity information comprises a VLAN designator.

5. The apparatus of claim 1, further comprising:
a hardware based network interface for implementing said host-wide network capability.

6. The apparatus of claim 1, further comprising:
a host-based unified virtual network interface instance included within said operating system of said host system and comprising host specific network capability; and
a second network capability provider instance operating within said operating system of said host system and interfacing with said host-based unified virtual network interface instance, wherein said host-based unified virtual network interface instance and said second network capability provider instance provide said host specific network capability for said host system as implemented through said network capability provider.

7. A method for providing service oriented network interfacing, comprising:
providing a plurality of unified virtual network interfaces included within a plurality of operating systems of a plurality of virtual machines operating within a virtual environment and providing a plurality of device specific network capabilities comprising network connectivity and quality of service requirements including network bandwidth allocation requirements for said plurality of virtual machines;
providing a plurality of network capability provider instances operating within an operating system of a host system and interfacing with said plurality of unified virtual network interface instances in paired relationships to provide said plurality of device specific network capabilities for said plurality of virtual machines through said host system;
providing a network capability provider comprising said plurality of network capability provider instances for enforcing sharing of host-wide network bandwidth based on said quality of service requirements of said plurality of unified virtual network interface instances as implemented through plurality of unified virtual network interfaces supported by said host system; and
configuring a network capability provider instance to characterize a corresponding unified virtual network interface in a 4-tuple data structure comprising an identifier holder for holding a unique identifier of said unified virtual network interface; a configurable network connectivity provided for a corresponding virtual machine by said host system; a services capability provided for said virtual machine; and properties of an underlying hardware resource providing said host-wide network capability.

8. The method of claim 7, further comprising:
configuring a unified virtual network interface instance to characterize corresponding device specific network capability for universal implementation within any network capability provider configured on any host system.

9. The method of claim 8, wherein said unique identifier in said method comprises a MAC address.

10. The method of claim 8, wherein said network connectivity information in said method comprises a VLAN designator.

11. The method of claim 8, further comprising:
providing a host-based unified virtual network interface instance included within said operating system of said host system and comprising host specific network capability; and
providing a second network capability provider instance operating within said operating system of said host system and interfacing with said host-based unified virtual network interface instance, wherein said host-based unified virtual network interface instance and said second network capability provider instance provide said host specific network capability for said host system as implemented through said network capability provider.

12. A method for configuring network interfacing, comprising:
receiving at a host system a plurality of unified virtual network instances included within a plurality of operating systems of a plurality of virtual machines operating within a virtual environment and providing a plurality of device specific network capabilities comprising network connectivity and quality of service requirements including network bandwidth allocation requirements for said plurality of virtual machines;
creating a plurality of network capability provider instances operating within an operating system of said host system and interfacing with said plurality of unified virtual network interface instances in paired relationships to provide said plurality of device specific network capabilities for said plurality of virtual machines through said host system;

configuring a network capability provider to include said plurality of network capability provider instances, wherein said network capability provider is configured for enforcing sharing of host-wide network bandwidth based on said quality of service requirements of said plurality of unified virtual network interface instances as implemented through said plurality of unified virtual network interfaces supported by said host system; and configuring a network capability provider instance to characterize a corresponding unified virtual network interface in a 4-tuple data structure comprising an identifier holder for holding a unique identifier of said unified virtual network interface; a configurable network connectivity provided for a corresponding virtual machine by said host system; a services capability provided for said virtual machine; and properties of an underlying hardware resource providing said host-wide network capability.

13. The method of claim 12, wherein in said receiving at a host system a plurality of unified virtual interface instances comprises:

receiving an instance of said corresponding virtual machine through a migration process.

14. The method of claim 12, further comprising:

configuring a unified virtual network interface instance to characterize corresponding device specific network capability for universal implementation within any network capability provider configured on any host system.

15. The method of claim 12, wherein said unique identifier in said method comprises a MAC address.

* * * * *